Dec. 4, 1934. C. F. MacGILL 1,983,381
APPARATUS FOR PRESERVING AND DISPENSING LIQUIDS
Filed Feb. 1, 1932 2 Sheets-Sheet 1
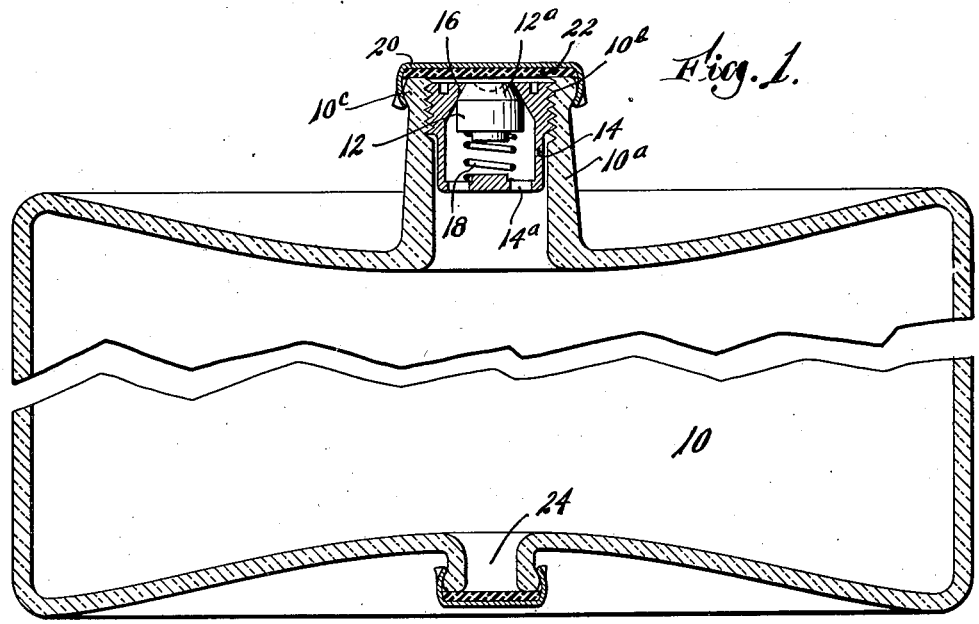
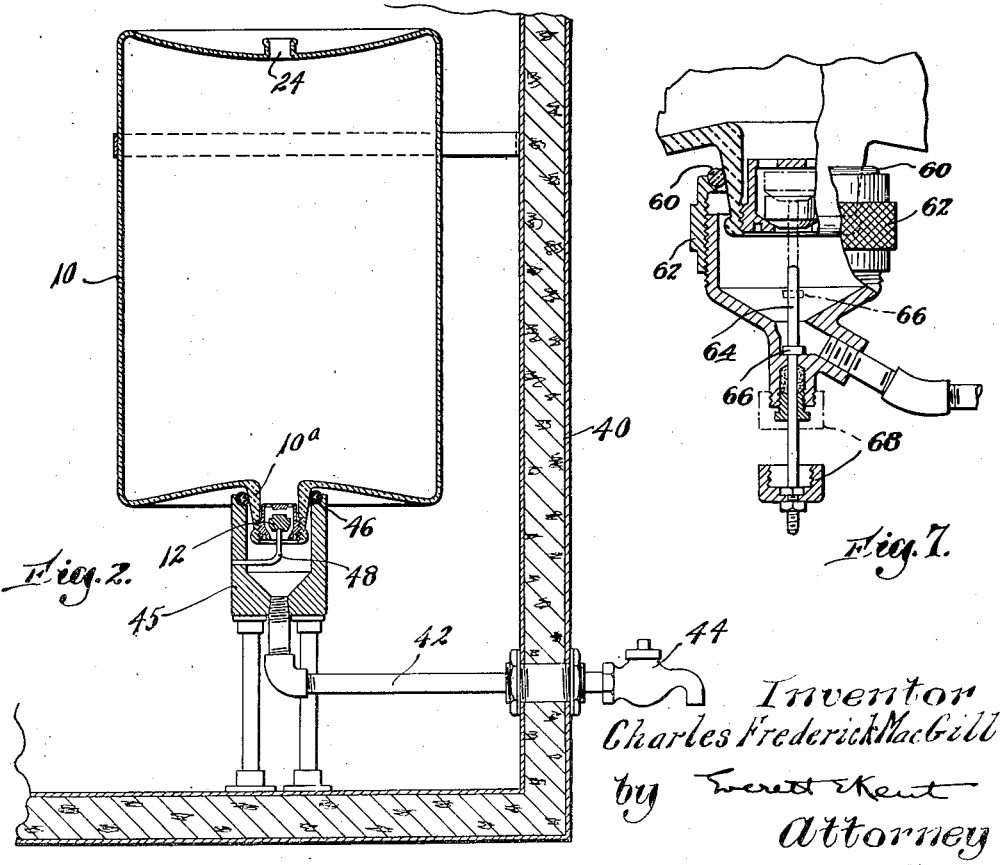
Inventor
Charles Frederick MacGill
by Everett Kent
Attorney Dec. 4, 1934.  C. F. MacGILL  1,983,381
APPARATUS FOR PRESERVING AND DISPENSING LIQUIDS
Filed Feb. 1, 1932   2 Sheets-Sheet 2
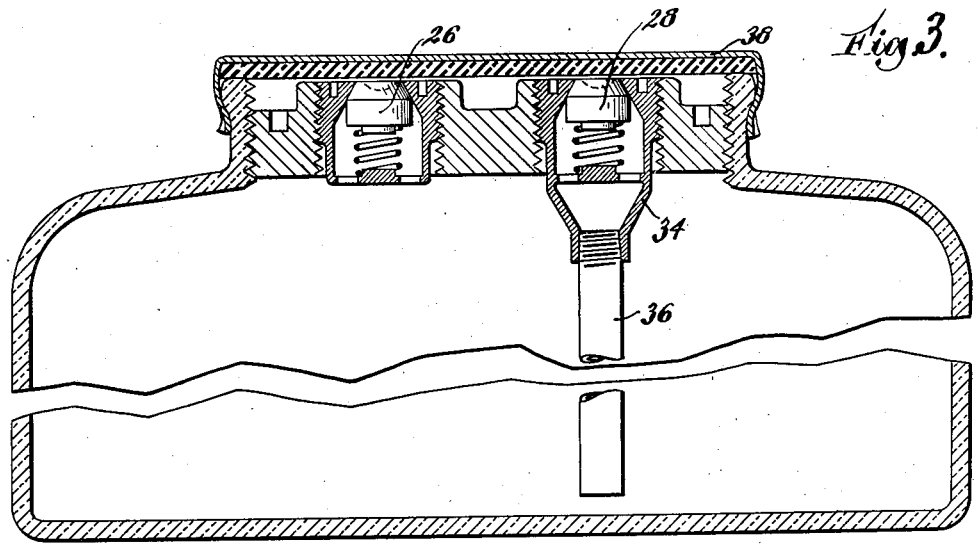
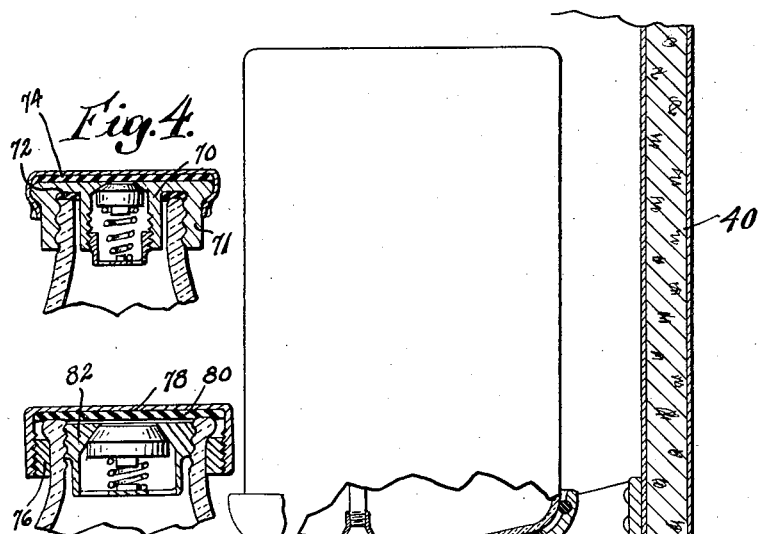
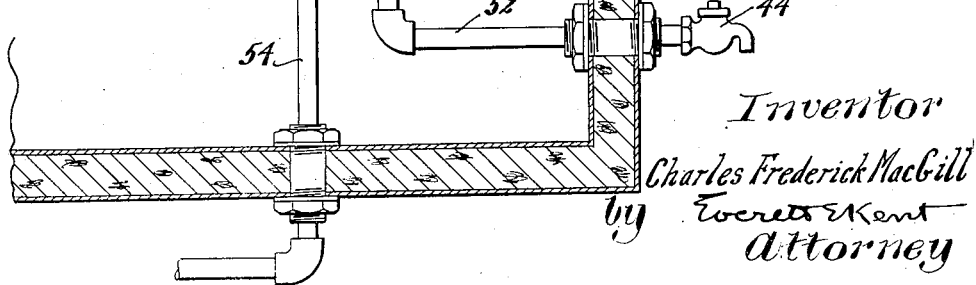
Inventor
Charles Frederick MacGill
by Everett E. Kent
Attorney

UNITED STATES PATENT OFFICE 1,983,381

APPARATUS FOR PRESERVING AND DISPENSING LIQUIDS

Charles Frederick MacGill, Newton, Mass.

Application February 1, 1932, Serial No. 589,990

12 Claims. (Cl. 225—22)

This invention relates to apparatus for preserving and dispensing liquids.

More particularly it relates to apparatus for handling beverages in bulk, as to their transportation, preservation and refrigeration; and for dispensing the same at retail, from the bulk container, and meantime keeping the contents of the partially emptied bulk container without deterioration of quality or of pressure.

Bottles and kegs, the only commercial devices heretofore extensively used for transporting and dispensing beverages, have serious limitations, both as to economy and as to utility; and although the world has used them for hundreds of years, they continue to be relatively very expensive. Bottles, for example, constitute a multitude of small packages, in which the cost and weight of glass and operations of packaging and sealing, freight and trucking, add disproportionately to the costs, so that in the end the unit retail price has to be relatively high. Attempting a remedy by using larger bottles results in danger of spoilage of contents which remain after a part has been sold. The commercial packaging of beverages in kegs requires the retailer to have an extensive plumbing system; and moreover this is adapted only to a limited range of beverages. And although glass containers of carboy or five gallon size are well known, I have not known hitherto of any satisfactory way to utilize them for sale of drinks at retail. Of the many devices proposed for discharging such large containers, none has proven practicable, so far as I am aware; especially not so for operation by sales persons of the grade that must be employed if the retail distribution is to be economical and extensive.

The present invention provides for refrigerating and for dispensing from large glass portable containers suitably sealed for transportation, and adapted to be at destination readily incorporated in the retail dispensing system. They are especially suited for beverages which deteriorate or ferment in the presence of air, or which require the maintenance of a predetermined pressure and content of carbon dioxide gas. And as the invention provides automatic features for the control of contents and valves during installation, they can be managed successfully at roadside stations and at any public place without especial skill on the part of the sales person, for dispensing contents by the glass at infrequent intervals, yet holding the undispensed contents safe, fresh and cold for an indefinitely long time.

Another feature provides for the replacement of dispensed contents by the introduction of carbon dioxide gas under desired pressure, without disturbing the remaining contents, thereby to preserve the full effervescent quality of certain kinds of beverages.

The container, however, may be used for various kinds of beverages, and permits of its contents being pasteurized as a preliminary to transportation or local use.

An important feature, both in the sanitary and in the commercial aspects, is the thorough and low-cost cleaning of a container, for re-use; and the invention provides also for this.

It has been proposed before that there might be an automatic valve in the container mouth; but experience has shown that all such valves are in themselves incapable of providing the necessary tightness of hermetic seal for preservation of contents during storage and transportation. A feature of the present invention provides a removable automatic valve of such type as to cooperate with an effective hermetic seal during transportation and storage preliminary to the installation in a dispensing apparatus, and to cooperate with contents-discharge and gas-supply details of dispensing apparatus while the container is being installed, refrigerated and discharged.

In attaining these objects and results the invention provides a device in which the bottle is combined with a removable mechanical valve and with an external hermetic seal which supplements the mechanical valve. The valve is made to be wholly enclosed within the neck of the bottle, or at least it does not project beyond the external lip of the bottle mouth, and the hermetic seal is placed over the mouth. Then the mechanical valve does not need to be hermetically tight during storage and transportation. Also a dispensing external seal is provided for the container while it is inverted in the dispensing apparatus. But this valve serves its function during the inverting act, and during the installing and adjusting of the container in the refrigeration apparatus, and it permits of those operations being performed unskilfully and as clumsily as may happen, without harm or loss of contents.

Likewise, if desirable or necessary, a vent may be provided at a convenient location in the container, preferably in its bottom, and this vent may be similarly hermetically and mechanically closed until such time as liquid is to be drawn. Hermetic seals of the type of ordinary bottle caps may serve.

The invention provides for introducing gas when necessary or desirable, by direct introduction to the space above the liquid in the inverted container, to maintain pressure and quality as liquid contents are dispensed. In such cases the container may have a much larger neck than is usual in a bottle, with two valved passages and a single large hermetic seal to supplement both valves during storage and transportation. One of these permits liquid outflow as above described. The other permits compensating gas inflow, through a small tube which, extending to near the bottom of the container, which becomes its top when inverted in the refrigeration apparatus, conducts gas through without disturbing the liquid.

The refrigerating compartment receives the container, mouth downward, over a draw-off conduit, and over the gas supply inlet conduit, if any, which conduits have means for automatically opening the throat valves simultaneously when the container is properly adjusted on its support.

It is intended that the patent shall cover, by suitable expression in the appended claims, whatever features of patentable novelty exist in the invention disclosed.

In the accompanying drawings:

Figure 1 is an elevation, in medial vertical section, of a container embodying features of the invention, part of the container being broken away;

Figure 2 shows the container of Figure 1 on a reduced scale, mounted and connected for use in a refrigerating and dispensing system;

Figure 3 is an elevation of a bottle type of container with a modified form of mouth closure;

Figures 4 and 5 show other modified forms of mouth closures;

Figure 6 shows the container of Figure 3, on a reduced scale, mounted and connected for use in a refrigerating dispensing and charge maintaining system, and Figure 7 shows a modified form of dispenser-connector with means for vertical adjustment, and for manual opening of the container valve after the container is seated.

Referring to the drawings, and particularly to Figures 1 and 2, the container 10 may be of any suitable material, shape and size, for convenient transportation of a beverage in bulk. Preferably it may be of glass, and of a size as large as one ordinary person can conveniently handle for insertion and inversion in a refrigerating system.

The invention provides for the retention of contents although inverted, and for immediate full-throated outflow when installed, after being inverted, without the preliminary addition or adjustment of any gadget or incidental appliance, after removal of the external hermetic seal in the ordinary and well-known manner of opening a sealed bottle, without leakage of contents, liquid or gaseous, or loss of pressure.

To this end is provided a valve 12 in the neck portion 10$^a$ of the container, and wholly within the throat thereof, in the sense that it does not extend outward far enough to interfere with the external hermetic sealing later to be described. As illustrated, the neck is internally threaded as at 10$^b$, and a valve housing 14 screws down into the throat so that the outer end of the housing 14 stands at or a little below the plane of the end of the neck. The valve 12 is mounted within the housing 14, and may have its outer portion beveled as at 12$^a$ for tight closure engagement with the valve seat 16 interiorly of the housing.

A coil spring 18 is arranged back of the valve constantly pressing the valve toward its seat. And the chamber bottom, formed as a grating or spider 14$^a$ provides communicating passages between the interior of the container 10 and the interior of the valve chamber. This neck and interior housing may be made as large as is requisite in order that the passages shall be large enough to yield the full desired rate of outflow of contents.

Because of the valve and its housing 14 standing wholly within the container neck, it is feasible to apply a hermetic seal, of the bottle cap variety, outside of and to supplement the valve 12 during storage and transportation. Such a cap is indicated at 20 with the usual gasket 22 underlying the disk of the cap, and with the usual crimped skirting flange engaging the bead 10$^c$ of the container neck.

If desired, a vent 24 may be provided at a suitable location in the container, preferably in the end opposite the mouth; and a similar hermetic seal may be applied over the vent, to be removed when the container has been installed and is ready for the beverage to be drawn.

In Figures 3 and 6 a bottle type of container is illustrated with a mouth cooperatively arranged to hold two valves 26, 28 operable therein. A plate 32 screws into the bottle mouth, which latter is exteriorly threaded for the purpose, and has threaded openings for reception of the valve housings for the respective valves 26, 28. Both valves and their housings may be similar to that of Figures 1 and 2; but preferably the valve 28 and its housing will be smaller in dimensions than its companion, and it has the interior projection 34 to which is connected a tube 36. This tube, made of any suitable material, extends through the interior of the container to a point near the opposite end, or bottom. A single large sized hermetic sealing cap 38 may be applied outside of both valves.

The form of Figures 3, 6 is adapted for supplying $CO_2$ gas to the interior of the container as an inert atmosphere for preventing the fermentation or deterioration of certain varieties of beverages, and for replacing liquid which is drawn off. The supply through pipe 54 may be controlled by a valve (not shown) which may ordinarily be left open when the apparatus as a whole is ready for use.

Where the liquid is a still beverage or the like, not requiring a closed or sealed container, no spring means back of the valve will be necessary, but rather a mere ball valve may be employed, if desired, operable by gravity and liquid urge when the container is inverted.

The containers above described are adapted for embodiment in a refrigerating and dispensing system, by being mounted bodily in a refrigerating chamber and automatically connected to the draw-off system. To this end a suitable support for the container is provided in the refrigerating compartment 40, (Figure 2); and a draw-off pipe 42, with control faucet 44, leads out of the compartment. The pipe 42 at its inner end has a hollow upstanding support 45 whose mouth has a gasket seat 46 for the bottle neck, with a pin or rod 48 projecting upward axially.

When a container is to be mounted in the refrigerator-dispenser, the hermetic seal is first to be removed. Then with the automatic mechanical valve holding the liquid, the container is to be inverted and set on its mount, with the neck, or such other portion as may be provided, fitting into the gasket seat 46 in the mouth of the support, with tight fit, and with the valve 12 being automatically unseated by the pin or rod 48, letting liquid flow into the draw-off system as far as the faucet 44. If the beverage be a still liquid and a vent 24 is provided, this may now be opened.

When the container embodies two valves, as in Figures 3, 6, each fits into a suitable seat 49, 50, the former on the draw-off pipe 52 and the latter on pipe 54 leading from a source of $CO_2$ gas; and the latter valve will be automatically unseated the same as the out-flow valve.

The mount for container in refrigerating chamber may be directly on the connector-cup 45 (Fig. 2), with the cup supporting the weight of container and contents; or a bracket support (Fig. 6) may sustain the said weight, and the connector-cup or cups merely fit snug and tight around the container opening or openings to ensure against leakage of liquid.

The invention thus makes possible a commercial system of economical packaging, distribution and retail sale of beverages of many varieties, still, charged, fermented, pasteurized, or other, with full preservation of initial qualities by the usual methods, notwithstanding lapse of time, and notwithstanding a partial dispensing. It combines the advantages of transportation in bulk with those of handling and selling at irregular intervals as customers may appear, and at places remote from the place of origin, by persons not particularly skilled. It is only necessary that the suitable refrigerating and dispensing apparatus be ready to receive it; and for such it is contemplated that local refrigerating apparatus of types already known may be used.

When the empties are returned the bottom openings 24 are useful in cooperation with the openings through necks 10a, for quick and thorough cleaning.

Although illustrated more especially as it may be applied for the dispensing of beverages, it is obvious that the invention is not limited by the particular use to which the liquid is put, and that it may be applied with liquids used for other purposes.

The type of container shown in Figures 1 and 2 embodies the practical advantage of having the vent, even when hermetically sealed, inward from the plane of the rim of the bottom wall in which it is located, and the vent and seal stand uninterferingly away from the ground or floor on which the container bottom may be resting.

Although especial means is shown as a vent, comprising a separate passage for inflow of air or other gas as liquid outflow proceeds, which makes a quick and free delivery, nevertheless it will be understood that without such a separate vent the passage through the valve housing 14 in the neck 10a is so liberal around the valve 12 and the pin 48 that penetrates and holds the valve open, and through the conduit 42 and faucet 44, that liquid can flow out and air simultaneously flow in, with a rapidity which will often be satisfactory even though there be no separate vent 24. The latter will be found especially useful when the liquid is thick or somewhat viscous, as in the case of certain syrups or fruit juices. The making of the seal, as between container and dispensing apparatus, by a gasket ring around the outside of the mouth of the container, and the having of the container's throat free for large flow to occur between the valve-opening pin 48 and the valve housing 14 contributes to this. Except when it is removed for cleaning, the valve 12 remains permanently in the glass container; and its cooperation with the dispenser is such that every container is ready to discharge upon merely having its cap removed and being inverted on the pin and gasket in the dispenser.

In Figure 7 there is illustrated an adapter type of draw-off connector. With this form, the bottle, or other container, preferably will be supported independently of the connector unit, such as in a bracket or the like as seen in Figure 6. But here the gasket 60 is carried by the coupling member 62, which latter is adjustable vertically to ensure a tight joint between container neck and gasket. It provides for variations in dimensions of the container neck and adapts the system for accommodation of a variety of sizes of container.

Also in Figure 7 I have illustrated a means for opening the container valve subsequent to the mounting of the container safely on its support with the valve still remaining closed. The pin 64 in this case is slidable down in the connector body, with a stop 66 for limiting downward motion, at a point where it will be out of engagement with the valve; and a handle 68, at its outer end. This handle is rotatable with recess in its upper surface, internally threaded. After the container has been properly seated, the pin 64 may, by this handle, be pushed upward into un-seating engagement with the container valve; and then, by rotation, this handle 68 can screw up on an exteriorly threaded lower end of the connector body, so that it maintains pin 64 in position holding the valve open.

If both the adapter and the adjustable pin features of Figure 7 are employed together, as illustrated, the cup-handle 68 preferably will be adjustable as to position along the pin, as shown.

The closure devices of Figures 4, 5 embody features which, in some cases, may be desirable. In Figure 4 the valve housing 70 fits into the bottle neck as in the preferred forms, but has a flange part 71 reaching over into threaded engagement with the exteriorly threaded bottle neck. And a gasket 72 may intervene to ensure tightness. The hermetic seal 74 fits over and engages said flange of the valve-housing unit.

Figure 5 has a permanent metal ring 76 on the bottle neck; and the outer cap 78, with underlying gasket 80, may be screwed down tight by hand, the threads on the cap engaging threads on the metal ring. In this case the valve housing 82 is screwed into the bottle neck.

I claim as my invention:

1. In a portable container for beverages and the like, a valve and valve housing removably secured within the container mouth, on the inner side of a plane across the external lips of the said mouth, said valve being located just inside said plane of the lips, seating outward for closing the passage, and there being pressure behind it, both in upright and inverted positions of the container, urging the valve toward its seat; and a flanged cap with underlying gasket secured in said plane across the said lips.

2. A portable container for beverages and the like having in one end a discharge opening and having in its other end a vent opening, one said opening having a spring-pressed interior valve urged closed from within, and both of said openings having external lips of glass and being adapted to be hermetically sealed by removable cap closures.

3. A portable container for beverages and the like, having an opening with valve for liquid outflow and an opening for gaseous inflow, one said opening having a spring-pressed valve therein urged toward its seat from within the container, these openings cooperating for discharge of the containers; and glass lips with removable hermetic sealing means fitting the lips for covering the openings during transportation.

4. A portable container for beverages and the like having in its mouth a closure plug with two openings through it, one for outflow of contents and the other for gaseous inflow; a valve for each said opening, each valve yieldably closing its opening from within; and a single exterior cap over the said mouth.

5. Apparatus for handling beverages and other liquids comprising the combination of a portable bulk container for the beverage, and relatively stationary apparatus for dispensing it from the container; the said container having a discharge mouth within which is an outward-seating valve, adapted to be opened by inward pressure; and the said stationary apparatus having a cup, with a gasket for engaging the inverted container externally around its mouth; a valve-opening pin for entering loosely the mouth of the inverted container, the looseness providing space around the pin for outflow of liquid into the cup; and a passage with flow control means, for discharge from the cup.

6. In apparatus of the class described, a glass container having a neck and mouth for discharge, equipped with interior check valve, combined separably with a dispenser having an upstanding stiff pin and soft gasket ring, adapted, when the container is inverted upon the pin and gasket, respectively to penetrate the neck and open the check valve, and to surround the mouth exteriorly and, there fitting against the glass, to constitute a liquid retaining passage thence to the discharge part of the dispenser.

7. A portable container for beverages and the like having in its mouth a closure plug with two openings through it, one for outflow of contents and the other for gaseous inflow; a valve for each said opening, each valve being yieldable to inward pressure; the said inflow opening having a tube extending interiorly to near the top of the inverted container; and the surroundings of the said outflow opening being adapted for connection to an external tube for control of the discharge.

8. A portable container for beverages and the like having in its discharge mouth a tubular housing for a vent; a valve in the housing; and a pipe continuation of the vent, from the housing interiorly to near the other end of the container; said housing having a screw mount in the container mouth.

9. A portable container for beverages and the like having two openings in the same end wall thereof, respectively for outflow of contents and for inflow of replacement gas; a valve for the inflow opening, yieldable to inward pressure; combined with apparatus from which the container is separable, having an outflow tube with faucet for intermittent discharge, and having a gas supply tube connected separably to the said inflow opening, and continuously open when connected.

10. A portable container for beverages and the like having a neck and mouth for discharge, and an interior spring-pressed valve, combined separably with a dispenser having an upstanding valve-unseating pin, and a soft gasket ring surrounding the mouth exteriorly and constituting the support for the inverted container; said support and said pin being rigid together, and being coordinated for the pin to project to valve-unseating position whenever the inverted container stands on its said support.

11. Apparatus for handling beverages and other liquids comprising the combination of a portable bulk container for the beverage, and relatively stationary apparatus for dispensing it from the container; the said container having a discharge mouth within which is an outward-seating valve, adapted to be opened by inward pressure; and the said stationary apparatus having a cup, with a gasket for engaging the inverted container externally around its mouth; a valve-opening pin manually operable to open said valve after the container and cup gasket are in the said engagement, for outflow of liquid into the cup; and a passage with flow control means, for discharge from the cup.

12. Apparatus for handling beverages and other liquids comprising the combination of a portable bulk container for the beverage, and relatively stationary apparatus for dispensing it from the container; the said container having a discharge mouth within which is an outward-seating valve, adapted to be opened by inward pressure; and the said stationary apparatus having a vertically adjustable cup, with a gasket adapted to be moved into tight engagement around the container mouth; a valve-opening pin for entering loosely the mouth of the inverted container, the looseness providing space around the pin for outflow of liquid into the cup; and a passage with flow control means, for discharge from the cup.

CHARLES FREDERICK MacGILL.